United States Patent
Hu et al.

(10) Patent No.: US 7,382,747 B2
(45) Date of Patent: Jun. 3, 2008

(54) SELECTING A SUBSET OF AUTOMATIC REQUEST RETRANSMISSION PROCESSES

(75) Inventors: Teck Hu, Budd Lake, NJ (US); Yifei Yuan, Kearny, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 486 days.

(21) Appl. No.: 10/942,732

(22) Filed: Sep. 16, 2004

(65) Prior Publication Data
US 2006/0056343 A1 Mar. 16, 2006

(51) Int. Cl.
*H04Q 7/24* (2006.01)
(52) U.S. Cl. ............................. 370/329; 370/469
(58) Field of Classification Search ............ None
See application file for complete search history.

(56) References Cited

U.S. PATENT DOCUMENTS 7,178,089 B1* 2/2007 Frenger et al. ............ 714/774
2002/0172192 A1* 11/2002 Hunzinger et al. ......... 370/352
2002/0172217 A1* 11/2002 Kadaba et al. ............. 370/443
2004/0160933 A1* 8/2004 Odenwalder et al. ...... 370/342
2006/0092972 A1* 5/2006 Petrivoc et al. ........... 370/469

OTHER PUBLICATIONS

3 GPP TSG-RAN WG1 AhHoc, Cannes, France, R1-040703: Joint Support of 2ms and 10ms TTI for EDCH; Jun. 21-24, 2004.
3 GPP TSG-RAN WG1 #38 bis, Seoul, South Korea, R1-04draft: Support of Low Minimum Rate of EDCH; Sep. 20-24, 2004.
3GPP TSG-RAN WG1 #bis, Seoul, South Korea, R1-041087: Autonomous Transmission with TDM Approach; Sep. 20-24, 2004.

* cited by examiner

*Primary Examiner*—Erika A. Gary

(57) ABSTRACT

The present invention provides a method of wireless telecommunication of according to an automatic repeat request protocol supporting a plurality of processes. The method includes selecting a subset of the plurality of processes based on a block size of at least one data packet, the subset comprising less than all of the plurality of processes.

21 Claims, 3 Drawing Sheets

Figure 2A

Stream 200:
| PACKET ID-1 211 | PACKET ID-2 212 | PACKET ID-3 213 | PACKET ID-4 214 | ... | PACKET ID-1 211 | PACKET ID-2 212 | PACKET ID-3 213 | PACKET ID-4 220 | ... |

Stream 205:
| NAK ID-1 215 | NAK ID-2 216 | NAK ID-3 217 | ACK ID-4 218 | ... |

Figure 2B

Stream 250:
| PACKET ID-1 261 | 265(1) | 265(2) | PACKET ID-2 262 | 265(3) | 265(4) | ... | PACKET ID-1 261 | 275(1) | 275(2) | 275(3) | PACKET ID-2 277 | 275(4) | ... |

Stream 255:
| NAK ID-1 270 | ACK ID-2 273 | ... |

SELECTING A SUBSET OF AUTOMATIC REQUEST RETRANSMISSION PROCESSES

BACKGROUND OF THE INVENTION

1. Field of the Invention

This invention relates generally to telecommunication systems, and, more particularly, to wireless telecommunication systems.

2. Description of the Related Art

Release 5 of the Universal Mobile Telecommunication System (UMTS) protocol permits each mobile unit, sometimes referred to as a user equipment or UE, to autonomously transmit messages to a base station (or Node-B) on a dedicated channel (or DCH). Most transmissions from the mobile unit are scheduled by the base station, which may result in scheduling gain. However, UE can autonomously transmit messages at any time without being scheduled by the base station. The autonomous transmission may cause interference to other channels associated with other mobile units, thereby increasing the rise-over-thermal at the base station, as well as having other undesirable effects that may offset a portion of the scheduling gain.

The autonomous transmissions are typically limited to certain rates, at least in part to limit the potential interference and control the rise-over-thermal. For example, each mobile unit may transmit in autonomous mode at a minimum transmission rate of at least 8 kbps. By limiting the data rate of the autonomous transmissions, the transmission power required of the mobile units may also be limited. Thus, the potential interference and rise-over-thermal may be kept with a desired range. However, the mobile unit may also transmit autonomously at higher bit rates with correspondingly higher channel powers, if it is determined that the potential interference and/or rise-over-thermal are not above some threshold level.

Future generations of mobile telecommunications standards may include an "enhanced" dedicated channel (EDCH). The enhanced dedicated channel may support one or more Transmission Time Intervals (TTIs), which may also be referred to as frame sizes. For example, UMTS release 6 may support both a 10 ms TTI and a 2 ms TTI, although the 2 ms TTI is not mandatory. The reduced frame sizes supported by future generations of mobile telecommunication standards may require a higher data transmission rate and, consequently, higher mobile unit transmission powers. For example, using typical assumed values for the size of a Radio Link Control (RLC) Packet Data Unit (PDU) and associated transmission overhead, the minimum data transfer rate necessary to transmit a data packet in a 2 ms TTI would be about 176 kbps. At this rate, the required channel power, or $E_c$, may be higher than could be supported by the mobile unit without causing unacceptably high levels of interference and/or rise-over-thermal at a receiving base station.

One proposal for reducing minimum data transfer rates includes restricting autonomous transmissions to a predetermined subset of TTIs. A subset of TTIs would then be assigned to each mobile unit when a communication link is established. However, this proposal has a number of drawbacks. For one example, scheduling gain may be reduced because the mobile units are forced to transmit during the predetermined TTIs, regardless of the condition or quality of service of the uplink channel during the TTI. Thus, the mobile unit may have to transmit autonomously while the uplink channel is temporarily degraded by a transient effect, such as fading, instead of rescheduling the autonomous transmission so that it is transmitted in a different TTI having a better channel condition.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for wireless telecommunication according to an automatic repeat request protocol supporting a plurality of processes. The method includes selecting a subset of the plurality of processes based on a block size of at least one data packet, the subset comprising less than all of the plurality of processes.

In another embodiment, of the present invention, a method is provided for wireless telecommunication according to an Automatic Repeat Request protocol supporting a plurality of processes. The method includes selecting a subset of the plurality of processes based on a block size of at least one data packet, the subset comprising less than all of the plurality of processes, associating the at least one data packet with at least one of the subset of the plurality of processes, and transmitting the at least one data packet using the at least one of the subset of the plurality of processes.

BRIEF DESCRIPTION OF THE DRAWINGS

The invention may be understood by reference to the following description taken in conjunction with the accompanying drawings, in which like reference numerals identify like elements, and in which:

FIG. 2A conceptually illustrates a first embodiment of an uplink channel and a downlink channel, in accordance with the present invention;

FIG. 2B conceptually illustrates a second embodiment of an uplink channel and a downlink channel, in accordance with the present invention.

Figure 1:
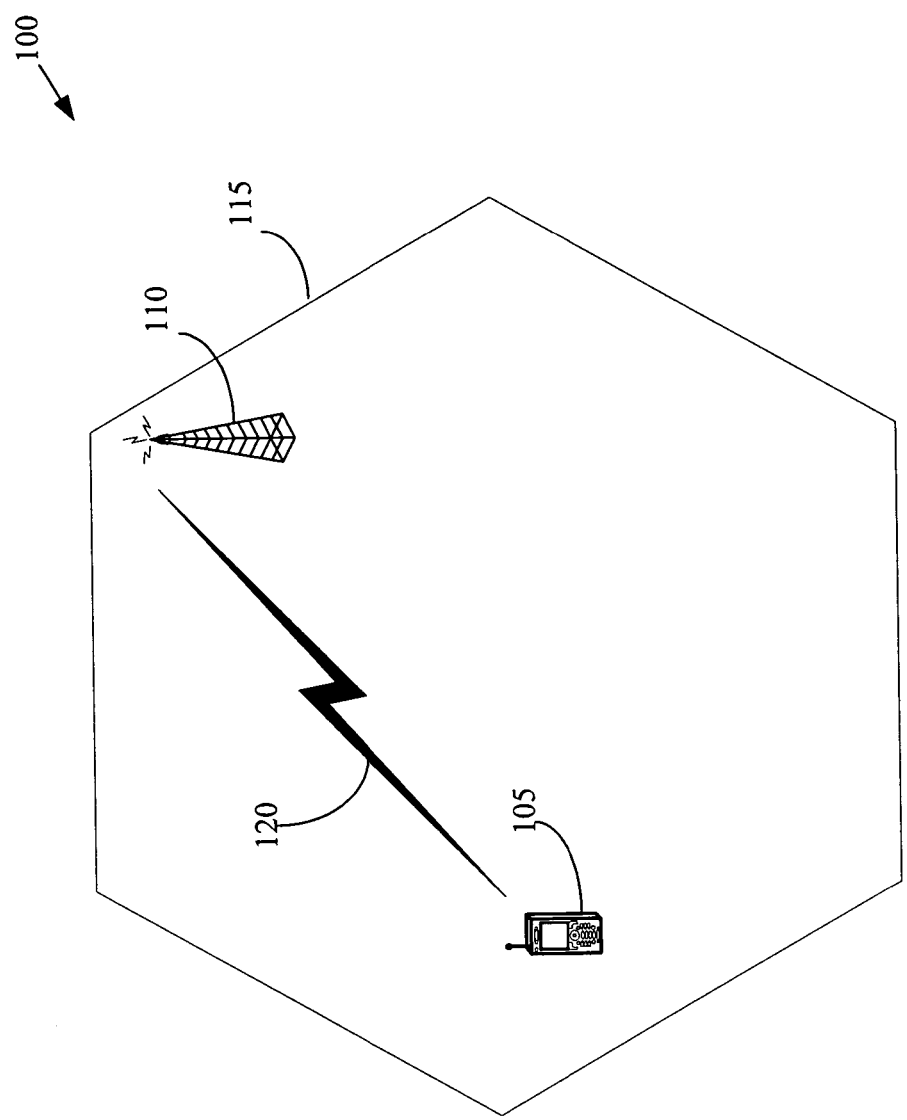
FIG. 1 conceptually illustrates one embodiment of a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one embodiment of a wireless telecommunication system 100. In the illustrated embodiment, a mobile unit 105 and a base station 110 in a cell 115 are communicatively coupled by a wireless telecommunication link 120. Although only a single mobile unit 105 and a single base station 110 are depicted in FIG. 1, persons, of ordinary skill in the art should appreciate that the present invention is not limited to one mobile unit 105 and one base station 110. In alternative embodiments, additional mobile units 105 and/or base stations 110, as well as any other desirable device, may be included in the wireless telecommunication system 100. For example, the wireless telecommunication system 100 may include a radio network controller, a mobile switching center, as well as various routers, switches, hubs, and the like.

The wireless telecommunication link 120 supports one or more channels that may be used to transmit messages between the mobile unit 105 and the base station 110. The channels may be defined in any desirable manner. For example, the channels may be determined according to protocols including, but not limited to, Universal Mobile Telecommunication System (UMTS), Code Division Multiple Access (CDMA), Time Division Multiple Access (TDMA), Personal Communication System (PCS), and Global System for Mobile telecommunications (GSM). The wireless telecommunication link 120 may also support one or more packet retransmission and/or error recovery protocols. For example, the wireless telecommunication link 120 may support an Automatic Repeat Request (ARQ) protocol, a Hybrid Automatic Repeat Request (HARQ) protocol, and the like.

FIG. 2A conceptually illustrates a first embodiment of an uplink channel 200 and a downlink channel 205, such as may be used to transmit packets between the mobile unit 105 and the base station 110 shown in FIG. 1. The uplink channel may be an enhanced dedicated channel (E-DCH), such as defined by UMTS release 6. In the illustrated embodiment, the uplink and downlink channels 200, 205 support an automatic repeat request protocol that allows a plurality of processes to operate concurrently. In one embodiment, a process is a functional unit within the mobile unit 105 and/or the base station 110 that transmits a data packet having a block size and then receives an acknowledgement (ACK or NAK) in response to the transmitted data packet. The process may then decide whether to retransmit the data packet or transmit a new data packet based on the ACK/NAK, as will be discussed in detail below. Processes may be implemented in hardware, software, or any combination thereof.

A plurality of processes may operate concurrently. In one embodiment, the uplink and downlink channels 200, 205 support a Hybrid Automatic Repeat Request (HARQ) protocol that allows four processes to operate concurrently. However, persons of ordinary skill in the art should appreciate that the present invention is not limited to the Hybrid Automatic Repeat Request (HARQ) protocol or four concurrent processes. In alternative embodiments, any desirable repeat request protocol having any desirable number of processes may be used.

In the illustrated embodiment, data packets 211, 212, 213, 214 are associated with four processes, which are indicated in FIG. 2A by ID-1, ID-2, ID-3, and ID-4, respectively, and transmitted on the uplink channel 200. The data packet 211 is not received and/or decoded successfully and a negative acknowledgement (NAK) 215 associated with the first process (ID-1) is provided on the downlink channel 205. The packet 211 is then retransmitted on the uplink 200 using the first process (ID-1) in response to receiving the NAK 215. The data packet 212 is not received and/or decoded successfully and a NAK 216 associated with the second process (ID-2) is provided on the downlink channel 205. The packet 212 is then retransmitted on the uplink 200 using the second process (ID-2) in response to receiving the NAK 216. The data packet 213 is not received and/or decoded successfully and a NAK 217 associated with the third process (ID-3) is provided on the downlink channel 205. The packet 213 is then retransmitted on the uplink 200 using the third process (ID-3) in response to receiving the NAK 217. The data packet 214 is received and decoded successfully, so an acknowledgement (ACK) 218 associated with the fourth process (ID-4) is provided on the downlink channel 205. A new packet 220 may now be transmitted on the uplink 200 using the fourth process (ID-4) in response to receiving the ACK 218.

Referring back to FIG. 1, transmissions on the wireless telecommunication link 120 are typically scheduled by the base station 110. However, the mobile unit 105 may also transmit messages that are not scheduled by the base station 110. Unscheduled transmissions from the mobile unit 105 will be referred to hereinafter as "autonomous" transmissions, in accordance with common usage in the art. In one embodiment, the mobile unit 105 may autonomously transmit messages (or data packets) having a block size that is approximately equal to a minimum block size for a particular Transport Format Combination (TFC), as defined by the relevant standard(s). The messages (or data packets) sent via autonomous transmissions may contain information that is used to maintain the wireless telecommunication link 120 while the mobile unit 105 is in an idle state.

In one embodiment of the present invention, a subset of the automatic repeat request processes is determined based upon the block size of the message. The subset includes less than all of the available processes. In one embodiment, messages having a block size about equal to a minimum transport block size may be transmitted and/or retransmitted using only the subset of the automatic repeat request processes. Messages having a block size greater than the minimum transport block size may be transmitted and/or retransmitted using all of the automatic repeat request processes. For example, the mobile unit 105 may autonomously transmit and/or retransmit a message having a block size about equal to the minimum block size using two of the four available processes, whereas the mobile unit 105 may transmit and/or retransmit a message having a block size that is greater than the minimum block size using four available processes.

However, the present invention is not limited to transmitting and/or retransmitting messages having a single block size using the subset of the processes. In one alternative embodiment, a threshold block size may be determined such that messages having a block size less than or about equal to the threshold transport block size may be transmitted and/or retransmitted using the subset of processes. Messages having a block size greater than the threshold transport block size may be transmitted and/or retransmitted using all of the available processes.

The subset of the processes may be determined at any desirable location. In one embodiment, the subset of the processes is determined at a central location such as a radio network controller (not shown). Information indicative of the subset of the processes is then sent to the mobile unit 105 and/or the base station 110. For example, information indicative of the subset of the processes may be sent to the base station 110 via a wired network and then the base stations may send information indicative of the subset of the processes to the mobile unit 105 via the wireless telecommunication link 120.

FIG. 2B conceptually illustrates a second embodiment of an uplink channel 250 and a downlink channel 255, such as may be used to transmit packets between the mobile unit 105 and the base station 110 shown in FIG. 1. The uplink channel 255 may be an enhanced dedicated channel (E-DCH), such as defined by UMTS release 6. In the illustrated embodiment, the uplink and downlink channels 250, 255 support an automatic repeat request protocol that allows a plurality of processes to operate concurrently. For example, the uplink and downlink channels 250, 255 support a Hybrid Automatic Repeat Request (HARQ) protocol that allows four processes to operate concurrently. However, persons of ordinary skill in the art should appreciate that the present invention is not limited to the Hybrid Automatic Repeat Request (HARQ) protocol or four concurrent processes. In alternative embodiments, any desirable repeat request protocol supporting operation of any desirable number of processes may be used.

In the illustrated embodiment, a subset of the four processes includes two processes, which are indicated in FIG. 2B by ID-1 and ID-2. Two data packets 261, 262 are associated with the processes ID-1 and ID-2, respectively. Persons of ordinary skill in the art should appreciate that the present invention is not limited to a subset of two processes selected from a set of four processes. In alternative embodiments, the subset may include any desirable number of processes selected from a set of any desirable plurality of processes.

The two data packets 261, 262 may then be transmitted in any of the time slots 265(1-4) that are associated with the four processes. For example, the two data packets 261, 262 may be transmitted in the time slots 265(1) and 265(3), respectively. In one embodiment, the time slots 265(1) and 265(2) may be selected for transmitting the data packets 261, 262 based on a channel condition, a quality of service, a priority, or any other desirable criteria. The data packet 261 is not successfully received and decoded, and so a NAK 270 associated with the first process (ID-1) is transmitted on the downlink 255. The data packet 261 is retransmitted in response to receiving the NAK 270. The data packet 262 is successfully received and decoded, and so an ACK 273 associated with the second process (ID-2) is transmitted on the downlink 255. A new data packet 277 is transmitted in response to receiving the ACK 275.

In the illustrated embodiment, the data packet 261 is retransmitted in the time slot 275(1) and the new data packet 277 is transmitted in the time slot 275(4). However, the present invention is not limited to this choice of time slots. In alternative embodiments, the data packets 261, 277 may be transmitted and/or retransmitted in any of the time slots 275(1-4). For example, since the subset includes two processes, any two of the time slots 275(14) may be selected for transmitting the data packets 261, 277. In various alternative embodiments, the two time slots 275(1-4) may be selected based on a channel condition, a quality of service, or any other desirable criteria. Persons of ordinary skill in the art should also appreciate that the data packets 261, 277 associated with the processes (ID-1, ID-2) may be transmitted in any desirable order. For example, the data packet 277 may be transmitted before the data packet 261.

Figure 3:
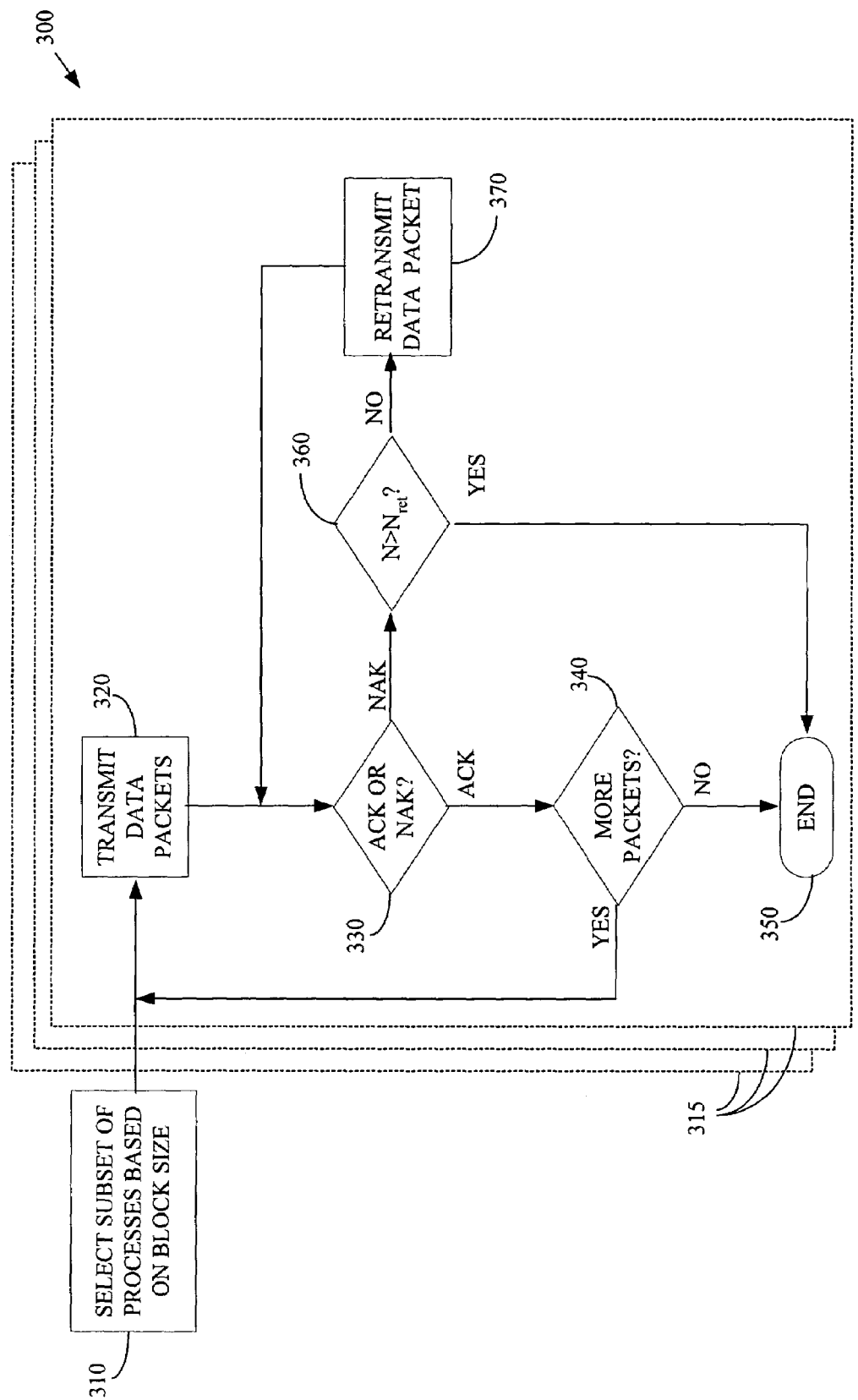
FIG. 3 conceptually illustrates a method of transmitting and/or retransmitting messages based on block size according to an automatic repeat request protocol that supports a plurality of processes, in accordance with the present invention.

FIG. 3 conceptually illustrates a method 300 of transmitting and/or retransmitting messages based on block size according to an automatic repeat request protocol that supports a plurality of processes. In the illustrated embodiment, a subset of the processes is determined (at 310) based on a block size of a message, as discussed in detail above. In the illustrated embodiment, each selected process in the subset carries out the steps 320, 330, 340, 350, 360, 370, concurrently, as indicated by the overlapping dashed boxes 315. A data packet is transmitted (at 320) in a selected time slots by each of the selected processes in the subset. Each process 315 then receives an ACK or a NAK in response to transmitting (at 320) the data packet. If an ACK is received, indicating that the data packet was received and decoded, the process 315 determines (at 330) whether there are more data packets to transmit. If so, a new packet is transmitted (at 320). If not, the process 315 ends (at 350).

If a NAK is received, indicating that the data packet was not received and/or decoded, the process 315 determines (at 360) whether the data packet may be transmitted. In one embodiment, the number of retransmissions ($N_{ret}$) may be limited and the process 315 may determine (at 360) whether the number of previous retransmissions in greater than the allowed number of retransmissions ($N_{ret}$). If so, the process 315 ends (at 350). If not, the data packet may be retransmitted (at 370).

The embodiments of the present invention described above may have a number of advantages over conventional practice, as well as proposed modifications to the wireless telecommunications standards. For example, by restricting the number of processes available to send data packets to a smaller subset of the total number of available automatic repeat request processes, the effective minimum rate may be reduced accordingly because the mobile unit is not allowed to send a minimum Transport Format Combination (TFC) at every TTI. Accordingly, interference, rise-over-thermal, and other undesirable effects may be reduced.

Restricting the number of processes available to send data packets to a subset of processes may also provide the mobile unit with flexibility to choose the TTI in which the data could be sent, e.g. any 2 processes out of 6 total processes. In contrast, restricting autonomous transmissions to a predetermined subset of TTIs reduces the system flexibility. For example, according to this proposal, a mobile unit may autonomously transmit minimum TFC(s) only when higher data rates have not been scheduled by a base station for the specific TTI. Thus, the mobile unit is either sending a rate scheduled by the base station (e.g., a Node-B controlled TFC subset) or a rate in the minimum TFC(s) set, so the subset of allowed TTIs may not coincide with the TTI that is available when the autonomous transmission needs to be used by the mobile unit.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless telecommunication according to an automatic repeat request protocol supporting a plurality of processes, comprising:
    selecting a subset of the plurality of processes for transmission of at least one data packet in response to determining that a block size of said at least one data packet is less than a selected block size, the subset comprising less than all of the plurality of processes;
    associating said at least one data packet with at least one of the subset of the plurality of processes and
    autonomously transmitting said at least one data packet from an idle mobile unit using said at least one of the subset of the plurality of processes.

2. The method of claim 1, wherein associating said at least one data packet with said at least one of the subset of the plurality of processes comprises associating said at least one data packet with said at least one of the subset of the plurality of processes based on at least one of a traffic type of the data packet and a priority of the data packet.

3. The method of claim 1, wherein autonomously transmitting said at least one data packet from the idle mobile unit using said at least one of the subset of the plurality of processes comprises autonomously transmitting said at least one data packet using said at least one of the subset of the plurality of processes at a minimum transport data rate when higher data rates have not been scheduled for an associated transmission time interval.

4. The method of claim 1, comprising:
    selecting a first time slot from a subset of time slots that corresponds to the subset of the plurality of processes; and
    transmitting said at least one data packet in the first time slot using said at least one of the subset of the plurality of processes.

5. The method of claim 4, wherein selecting the first time slot comprises selecting the first time slot based upon at least one of a channel condition and a quality of service.

6. The method of claim 4, comprising receiving a negative acknowledgement in response to transmitting said at least one data packet.

7. The method of claim 6, comprising retransmitting said at least one data packet in a second time slot using said at least one of the subset of the plurality of processes in response to receiving the negative acknowledgement.

8. The method of claim 7, wherein retransmitting the data packet in the second time slot comprises selecting the second time slot from the subset of time slots that corresponds to the subset of the plurality of processes based upon at least one of a channel condition and a quality of service.

9. The method of claim 1, wherein selecting the subset of the plurality of processes comprises selecting the subset of the plurality of processes for transmission of at least one data packet in response to determining that the block size of said at least one data packet is less than at least one of a minimum transport block size and a threshold block size.

10. The method of claim 1, wherein substantially no data packets are transmitted by unselected processes.

11. The method of claim 1, wherein the automatic repeat request protocol is at least one of an Automatic Repeat Request (ARQ) protocol and a Hybrid Automatic Repeat Request (HARQ) protocol.

12. A method of wireless telecommunication of according to a Hybrid Automatic Repeat Request protocol supporting a plurality of processes, comprising:
- selecting a subset of the plurality of processes for transmission of at least one data packet in response to determining that a block size of said at least one data packet is less than a selected block size, the subset comprising less than all of the plurality of processes;
- associating the at least one data packet with at least one of the subset of the plurality of processes; and
- autonomously transmitting the at least one data packet from an idle mobile unit using the at least one of the subset of the plurality of processes.

13. The method of claim 12, wherein associating the at least one data packet with the at least one of the subset of the plurality of processes comprises associating the at least one data packet with the at least one of the subset of the plurality of processes based on at least one of a traffic type of the data packet and a priority of the data packet.

14. The method of claim 12, wherein autonomously transmitting the at least one data packet from the idle mobile unit using the at least one of the subset of the plurality of processes comprises autonomously transmitting the at least one data packet from the idle mobile unit using the at least one of the subset of the plurality of processes at a minimum transport data rate when higher data rates have not been scheduled for an associated transmission time interval.

15. The method of claim 12, wherein transmitting the at least one data packet using the at least one of the subset of the plurality of processes comprises:
- selecting a first time slot from a subset of time slots that corresponds to the subset of the plurality of processes; and
- transmitting the at least one data packet in the first time slot using the at least one of the subset of the plurality of processes.

16. The method of claim 15, wherein selecting the first time slot comprises selecting the first time slot based upon at least one of a channel condition and a quality of service.

17. The method of claim 12, comprising receiving at least one negative acknowledgement in response to transmitting the at least one data packet.

18. The method of claim 17, comprising retransmitting the at least one data packet in a second time slot selected from a subset of time slots that corresponds to the subset of the plurality of processes using the at least one of the subset of the plurality of processes in response to receiving the at least one negative acknowledgement.

19. The method of claim 18, wherein retransmitting the at least one data packet in the second time slot comprises selecting the second time slot based upon at least one of a channel condition and a quality of service.

20. The method of claim 12, wherein selecting the subset of the plurality of processes comprises selecting the subset of the plurality of processes for transmission of at least one data packet in response to determining that the block size of said at least one data packet is less than at least one of a minimum transport block size and a threshold block size.

21. The method of claim 12, wherein substantially no data packets are transmitted by unselected processes.

* * * * *